US012680624B2

(12) United States Patent
Navon et al.

(10) Patent No.: US 12,680,624 B2
(45) Date of Patent: Jul. 14, 2026

(54) INTEGRATED PRESSURE BALANCING SYSTEM IN BALL VALVE

(71) Applicant: Habonim Industrial Valves & Actuators Ltd., Galil Elion (IL)

(72) Inventors: Ido Navon, Sde Ilan (IL); Einat Opalin, Haifa (IL); Guy Cooper, Kibbutz Kadarim (IL)

(73) Assignee: Habonim Industrial Valves & Actuators Ltd., Kibbutz Kfar Hanassi (IL)

( * ) Notice: Subject to any disclaimer, the term of this patent is extended or adjusted under 35 U.S.C. 154(b) by 0 days.

(21) Appl. No.: 18/928,508

(22) Filed: Oct. 28, 2024

(65) Prior Publication Data

US 2026/0117890 A1 Apr. 30, 2026

(51) Int. Cl.
    *F16K 39/06* (2006.01)
    *F16K 5/06* (2006.01)

(52) U.S. Cl.
    CPC ............... *F16K 39/06* (2013.01); *F16K 5/06* (2013.01); *F16K 5/0647* (2013.01)

(58) Field of Classification Search
    CPC . F16K 5/0605; F16K 5/06; F16K 5/08; F16K 39/06; F16K 5/0647
    See application file for complete search history.

(56) References Cited

U.S. PATENT DOCUMENTS

| | | | | |
|---|---|---|---|---|
| 2,879,800 | A | * | 3/1959 | Komrosky .............. F16K 39/06 137/630.22 |
| 3,068,887 | A | * | 12/1962 | Grove ................... F16K 5/0673 137/329.01 |
| 3,182,953 | A | * | 5/1965 | Montesi ................ F16K 5/0626 251/283 |
| 3,209,779 | A | * | 10/1965 | McGowen, Jr. ...... F16K 5/0605 138/44 |
| 3,610,286 | A | * | 10/1971 | McGowen, Jr. ...... F16K 5/0605 138/44 |
| 4,076,211 | A | * | 2/1978 | Krechel ................ F16K 39/06 251/315.1 |
| 4,293,163 | A | * | 10/1981 | Braddick ............... F16K 5/205 251/315.16 |

(Continued)

FOREIGN PATENT DOCUMENTS

| | | | | | |
|---|---|---|---|---|---|
| CH | | 114838 | A | * 7/1926 | ............. F16K 39/06 |
| CN | | 107084259 | A | * 8/2017 | ............. F16K 51/00 |

(Continued)

OTHER PUBLICATIONS

PCT Search and Written Opinion, PCT/IB2025/060675, Feb. 27, 2026.

*Primary Examiner* — David Colon-Morales
(74) *Attorney, Agent, or Firm* — Dekel Patent Ltd.; David Klein

(57) ABSTRACT

A valve includes a ball coupled to a stem which is turnable by an operator element. The ball is formed with a flow passage and the ball is sealed in a valve seat by means of seals. The stem includes bypass structure, which upon rotation of the stem, is alignable with an upstream diverging tube and with a downstream diverging tube to allow bypass fluid flow from the upstream diverging tube to the downstream diverging tube for balancing a difference in pressure between upstream and downstream portions of the valve.

9 Claims, 6 Drawing Sheets

(56)        References Cited

U.S. PATENT DOCUMENTS

| | | | | |
|---|---|---|---|---|
| 4,296,913 | A | 10/1981 | Hoyer | |
| 4,548,237 | A * | 10/1985 | Bogenschutz | F16K 5/0605 |
| | | | | 251/315.12 |
| 4,577,662 | A * | 3/1986 | Doremus | E21B 21/106 |
| | | | | 137/630.21 |
| 4,848,401 | A * | 7/1989 | Devilleger | E21B 34/02 |
| | | | | 137/601.19 |
| 5,052,657 | A * | 10/1991 | Winship | F16K 5/06 |
| | | | | 166/324 |
| 5,255,706 | A * | 10/1993 | Chudakov | F16K 39/06 |
| | | | | 137/599.17 |
| 9,897,218 | B2 | 2/2018 | Gamache | |
| 11,079,034 | B2 * | 8/2021 | Mentzel | F16K 5/0668 |
| 2005/0269544 | A1 * | 12/2005 | Oh | F16K 5/0605 |
| | | | | 251/315.01 |
| 2015/0377366 | A1 * | 12/2015 | Hartman | F16K 5/0689 |
| | | | | 251/315.16 |
| 2022/0074518 | A1 * | 3/2022 | Wang | F16K 27/067 |

FOREIGN PATENT DOCUMENTS

| | | | | | |
|---|---|---|---|---|---|
| CN | 107842627 | A * | 3/2018 | | F16K 5/06 |
| DE | 102011013097 | A1 * | 6/2012 | | F16K 39/06 |
| EP | 2884144 | A1 * | 6/2015 | | F16K 5/20 |
| FR | 857607 | A * | 9/1940 | | |
| FR | 985053 | A * | 7/1951 | | |
| FR | 2865013 | A1 * | 7/2005 | | F16K 39/028 |

* cited by examiner

INTEGRATED PRESSURE BALANCING SYSTEM IN BALL VALVE

FIELD OF THE INVENTION

The present invention generally relates to ball valves, and particularly to an integrated pressure balancing system in a ball valve.

BACKGROUND OF THE INVENTION

As is well known in the art of valves for liquid flow systems, rapidly closing or opening a ball valve can cause pressure changes in pipelines, which may lead to hydraulic shock, also called water hammer, which causes strong vibrations and shocks. Hydraulic shock can cause serious damage to pipes, valves or other equipment in the system. The hydraulic shock becomes greater if the pressure change and/or the size of the ball valve becomes larger.

There are two basic solutions that have been used in the prior art for many years to deal with the problem of hydraulic shock. One solution is to slow operation of the ball valve. This may be done in several ways, such as by using an electric actuator with speed control, or by using a pneumatic actuator with port reducers, or by using a manual gear. There are several disadvantages to slowing the operation of the ball valve. For example, slowing the operation may cause damage to the ball and internal parts during the slower operation, due to turbulence and high-speed flow in a relatively small passage. Another problem is it is difficult to calibrate the required operation speed. This solution is not applicable for manual operation, and generally involves significantly extra costs.

Another solution is a bypass valve that equalizes pressure between the upstream and downstream sides of the ball valve. The bypass valve is external to the ball valve. Bypass pipelines are welded to upstream and downstream sides of the ball valve and these bypass pipelines lead to a small port to which the smaller bypass valve is hydraulically connected. Alternatively, instead of bypass pipelines, material may be added to the ball valve body to provide room for the small port to which the smaller bypass valve is hydraulically connected.

There are several disadvantages to the prior art external bypass valve. This solution requires two different actuators, one for the bypass valve and another for the ball valve. This inherently has another disadvantage: the main valve may be operated without bypassing the flow, defeating the purpose of the bypass valve. In addition, this solution involves more work and costs, and adds weight to the main valve.

SUMMARY

The present invention seeks to provide a valve assembly that solves the problem of the prior art, as is described hereinbelow. The valve assembly of the present invention as is described below. It is noted that the term "fluid" encompasses any liquid or gas.

There is provided in accordance with a non-limiting embodiment of the invention a valve including a ball coupled to a stem which is turnable by an operator element, the ball being formed with a flow passage and the ball being sealed in a valve seat by means of seals, and wherein the stem includes bypass structure, which upon rotation of the stem, is alignable with an upstream diverging tube and with a downstream diverging tube to allow bypass fluid flow from the upstream diverging tube to the downstream diverging tube for balancing a difference in pressure between upstream and downstream portions of the valve.

In accordance with a non-limiting embodiment of the invention an outer diameter of the ball and a diameter of the flow passage are such that when the ball is turned 90° minus a rotation angle α from a fully open position, the ball is closed to flow therethrough, and the bypass structure is aligned with the upstream diverging tube and with the downstream diverging tube upon rotation of the stem through the rotation angle α.

In accordance with a non-limiting embodiment of the invention the bypass structure includes an indentation formed on the stem, the indentation having a surface which is radially inwards of an outer contour of the stem.

In accordance with a non-limiting embodiment of the invention the stem includes a ball key portion which couples with a keyway aperture formed in an interface member extending from the ball, and the ball key portion is shaped to allow free rotation of the stem with respect to the keyway aperture through the rotation angle α.

In accordance with a non-limiting embodiment of the invention the ball key portion includes a pair of relatively long flat faces that are inclined so a width of the ball key portion is widest at a center of a long side of the ball key portion, and a pair of relatively short flat faces that are inclined so a length of the ball key portion is longest at a center of a short side of the ball key portion.

In accordance with a non-limiting embodiment of the invention the bypass structure is positioned between, and is rotatable to align with, a pair of bypass pistons which are arranged to slide inside bypass tubes, one of the bypass tubes being an upstream bypass tube which is in fluid communication with the upstream diverging tube, and another one of the bypass tubes being a downstream bypass tube which is in fluid communication with the downstream diverging tube, and wherein each of the pistons is urged by a biasing device towards the stem.

In accordance with a non-limiting embodiment of the invention when the pistons abut against an outer contour of the stem and not against the bypass structure, the pistons seals the bypass tubes so the bypass fluid flow cannot flow from the upstream diverging tube to the downstream diverging tube.

In accordance with a non-limiting embodiment of the invention when the pistons abut against the bypass structure, the pistons do not seal the bypass tubes so the bypass fluid flow can flow from the upstream diverging tube to the downstream diverging tube.

In accordance with a non-limiting embodiment of the invention when the pistons abut against the bypass structure, the bypass fluid flow leaks out of the upstream bypass tube and circulates in an area around the stem and enters the downstream bypass tube and then exits through the downstream diverging tube.

In accordance with a non-limiting embodiment of the invention when the flow passage of the ball is open to flow, the bypass structure blocks the bypass fluid flow from the upstream diverging tube to the downstream diverging tube. Alternatively, in accordance with another non-limiting embodiment of the invention, when the flow passage of the ball is open to flow, the bypass structure permits the bypass fluid flow from the upstream diverging tube to the downstream diverging tube.

BRIEF DESCRIPTION OF DRAWINGS

The present invention will be understood and appreciated more fully from the following detailed description, taken in conjunction with the drawings in which.

DETAILED DESCRIPTION

Figure 1A:
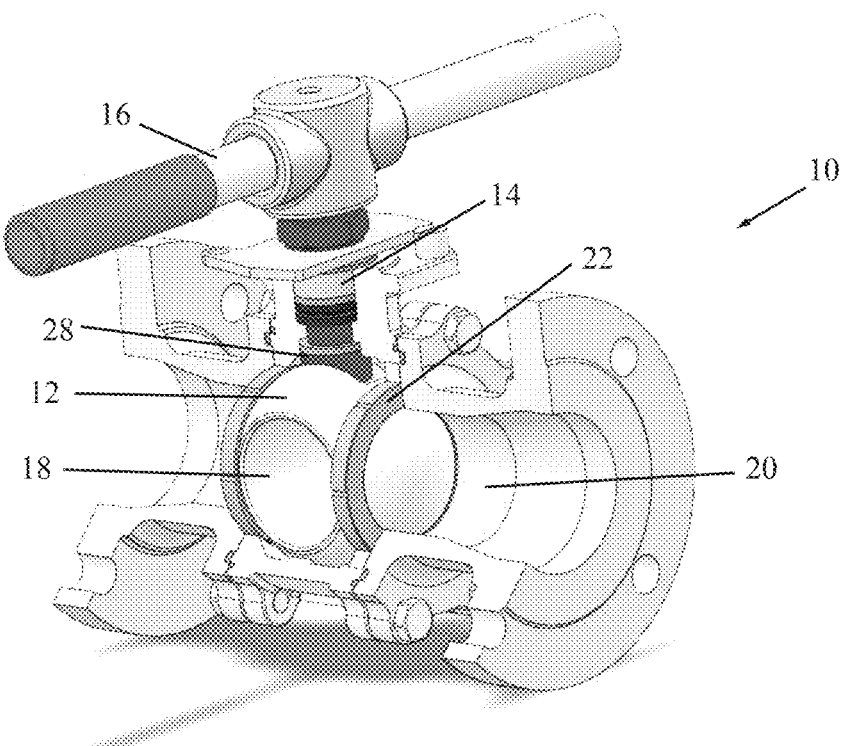
FIGS. 1A and 1B are simplified perspective illustrations of a ball valve, in respective closed and open positions.
Figure 1B:
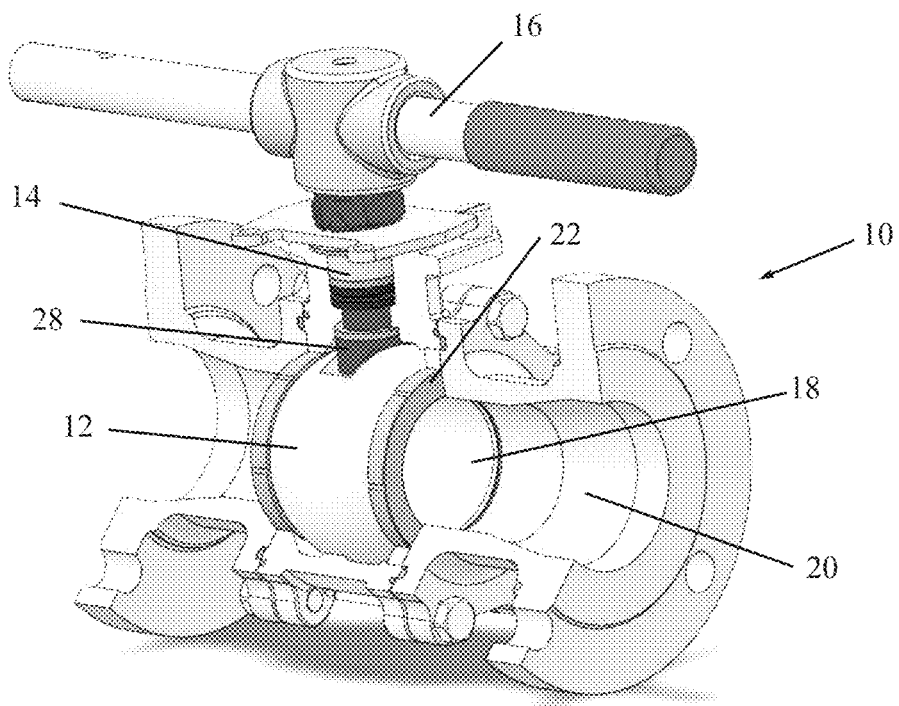

Reference is now made to FIGS. 1A and 1B, which illustration a ball valve 10, in respective closed and open positions, in accordance with a non-limiting embodiment of the invention. In these figures, the bypass feature is omitted for the sake of simplifying the explanation of the operation of the ball without turning a full 90°.

The ball valve 10 includes a ball 12 coupled to a stem 14, which is turned by an operator element 16, which in the illustration is a manual handle but could also be a non-manual operator element, such as a hydraulic, pneumatic or electric operator element. Ball 12 is formed with a flow passage 18. In the open position (FIG. 1B), flow passage 18 is aligned with the flow passage of a pipe 20 so that liquid can flow from the flow passage of pipe 20 through the flow passage 18 of the ball valve. In the closed position (FIG. 1A), the valve stem 14 has been turned 90° so that the flow passage 18 is not aligned with the flow passage of pipe 20 so that liquid is now blocked from flowing from the flow passage of pipe 20 to the flow passage 18 of the ball valve. The ball 12 may be sealed in its valve seat by means of seals 22.

Figures 2, 3A, 3B:
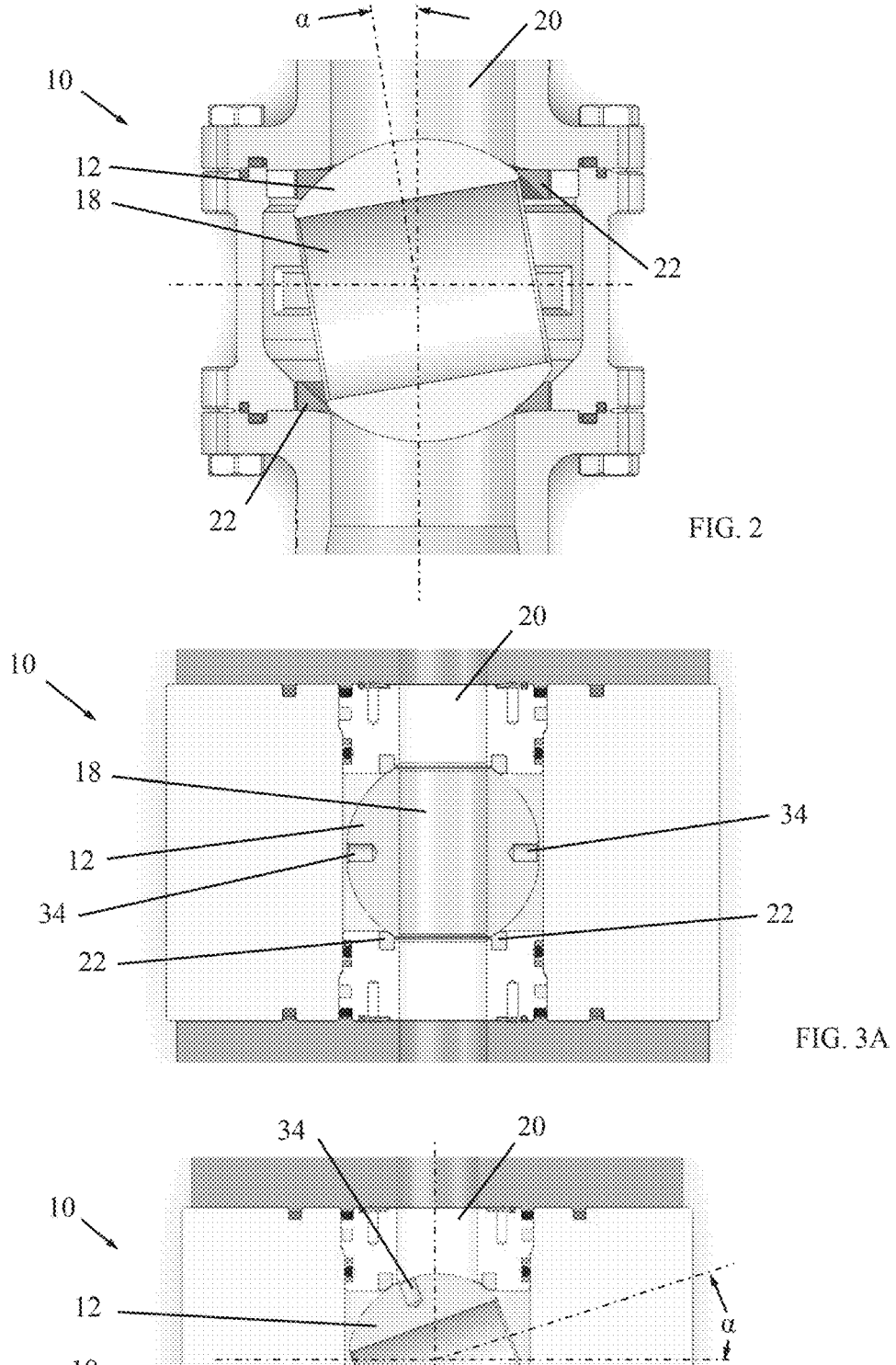
FIG. 2 is a simplified illustration of the ball rotated a few degrees without passing any flow.
FIGS. 3A and 3B are simplified illustrations of the ball valve in open and closed positions, respectively, showing that the valve is closed with less than 90° rotation, meaning the rotation required to operate the valve is 90°–α.

Reference is now made to FIG. 2, which shows that even when ball 12 is not turned exactly 90° from the fully open position, and instead is angularly offset (turned) from the 90° position by an angle α, the valve 10 is closed to flow therethrough. The reason is the outer diameter of the ball 12 and the diameter of the inner flow passage 18 are such that the outer contour of the ball 12 is still sealed with respect to seals 22 angle α. The angle α may be, without limitation, between 5° and 15°. The ratio of the outer diameter of the ball 12 to the diameter of the inner flow passage 18 determines the magnitude of angle α. If this ratio increases, angle α also increases.

In high pressure valves, the outer diameter of ball 12 is often enlarged in order to allow a bigger stem 14 to operate the valve (in order to overcome higher torque needed to turn the stem). In such cases, α will increase.

Reference is now made to FIGS. 3A and 3B, which illustrate the ball valve 10 in open and closed positions, respectively. One sees that the valve is closed with less than 90° rotation, meaning the rotation required to operate the valve is 90°–α.

Figure 4A:
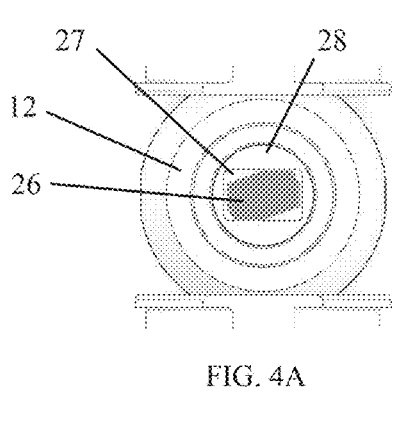
FIGS. 4A and 4B are simplified top-view and pictorial illustrations, respectively, of the stem (shaft) of the ball valve when the ball valve is in the open position, in accordance with a non-limiting embodiment of the invention.
Figure 4B:
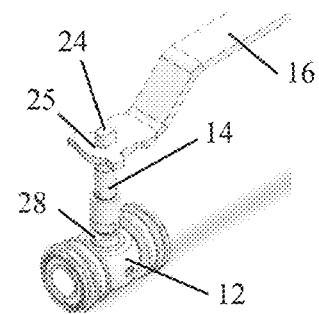
Figure 5A:
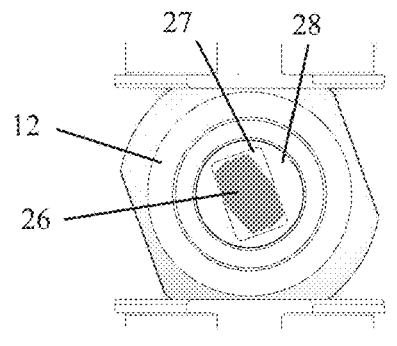
FIGS. 5A and 5B are simplified top-view and pictorial illustrations, respectively, of the stem of the ball valve when the ball valve is in the closed position, showing there is free play between the stem and the stem seat of the ball, and in this position, the bypass structure of the stem is in the open position, in accordance with a non-limiting embodiment of the invention.
Figure 5B:
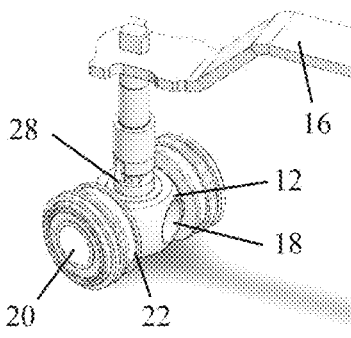
Figure 6A:
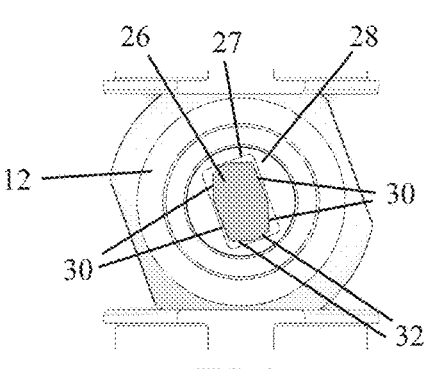
FIGS. 6A and 6B are simplified top-view and pictorial illustrations, respectively, of the stem of the ball valve, showing that due to the free play between the stem and the stem seat of the ball, in this position the bypass structure of the stem has been turned to the closed position (through the angle α) and the ball valve remains in the closed position, in accordance with a non-limiting embodiment of the invention.
Figure 6B:
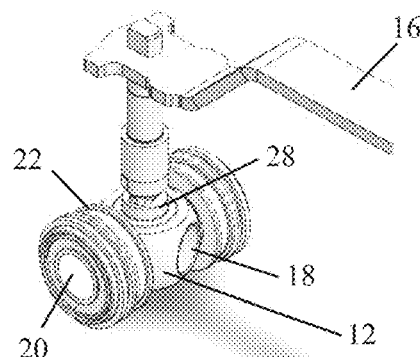
Figure 7:
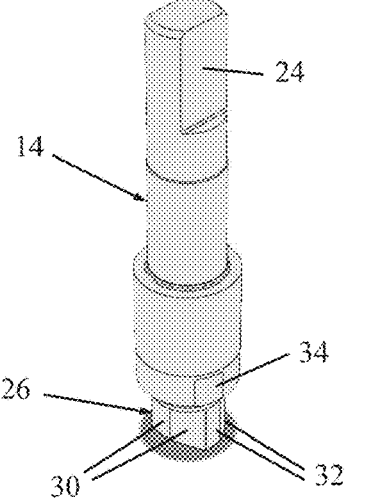
FIG. 7 is a perspective illustration of the stem of the ball valve, in accordance with a non-limiting embodiment of the invention.

Reference is now made to FIG. 7, which illustrates the stem 14 of the ball valve, in accordance with a non-limiting embodiment of the invention. Stem 14 may include an operator element key portion 24, such as flat surfaces formed in the stem to create a square or rectangular key, which couples with the operator element 16 (such as by being received in a complementary shaped keyway aperture 25 formed in operator element 16 (as seen in FIG. 4B). At an opposite end thereof, stem 14 may include a ball key portion 26 which couples with a keyway aperture 27 formed in an interface member 28 extending from ball 12 (seen in FIGS. 1A, 1B, and 4A-6B).

In accordance with an embodiment of the invention, ball key portion 26 is not shaped to match the shape of keyway aperture 27. Instead ball key portion 26 is shaped to allow free rotation of stem 14 with respect to keyway aperture 27 through rotation angle α. For example, as seen best in FIG. 6A, ball key portion 26 may be described as a polygon, which instead of having two flat long parallel sides and two flat short parallel sides (which would be a rectangle key that fits snugly into the rectangular keyway aperture 27), has eight sides or faces (or facets): each of the two long parallel sides is replaced by a pair of flat faces 30 that are inclined so the width of the ball key portion 26 is widest at a center of the long side of ball key portion 26, and each of the two short parallel sides is replaced by a pair of flat faces 32 that are inclined so the length of the ball key portion 26 is longest at a center of the short side of the ball key portion 26. Alternatively, the pair of flat faces 30 could be replaced by a single curved surface so the width of the ball key portion 26 is widest at a center of the long side of ball key portion 26, and the pair of flat faces 32 could be replaced by a single curved surface so the length of the ball key portion 26 is longest at a center of the short side of the ball key portion 26.

Referring again to FIG. 7, stem 14 includes bypass structure to allow bypass flow for balancing the difference in pressure between the upstream and downstream portions of the valve, as is now explained.

The bypass structure may be an indentation 34 (called bypass indentation 34) formed on the stem 14. The term "indentation" encompasses a groove, depression, undercut, hole or any other structure which has a surface which is radially inwards of the outer contour of the stem 14. The bypass indentation 34 is positioned between, and is rotatable to align with, a pair of bypass pistons 38 which are arranged to slide inside bypass tubes 36 (seen in FIGS. 8A-10B). Referring to FIGS. 8A-10B, it is seen that each piston 38 is urged by the force of a biasing device 51 (such as a coil spring) towards stem 14.

The operation of ball valve 10 includes three steps, which are described with reference to FIGS. 8A-10B, and which are summarized in Table 1 below.

Figures 8A, 8B, 8C:
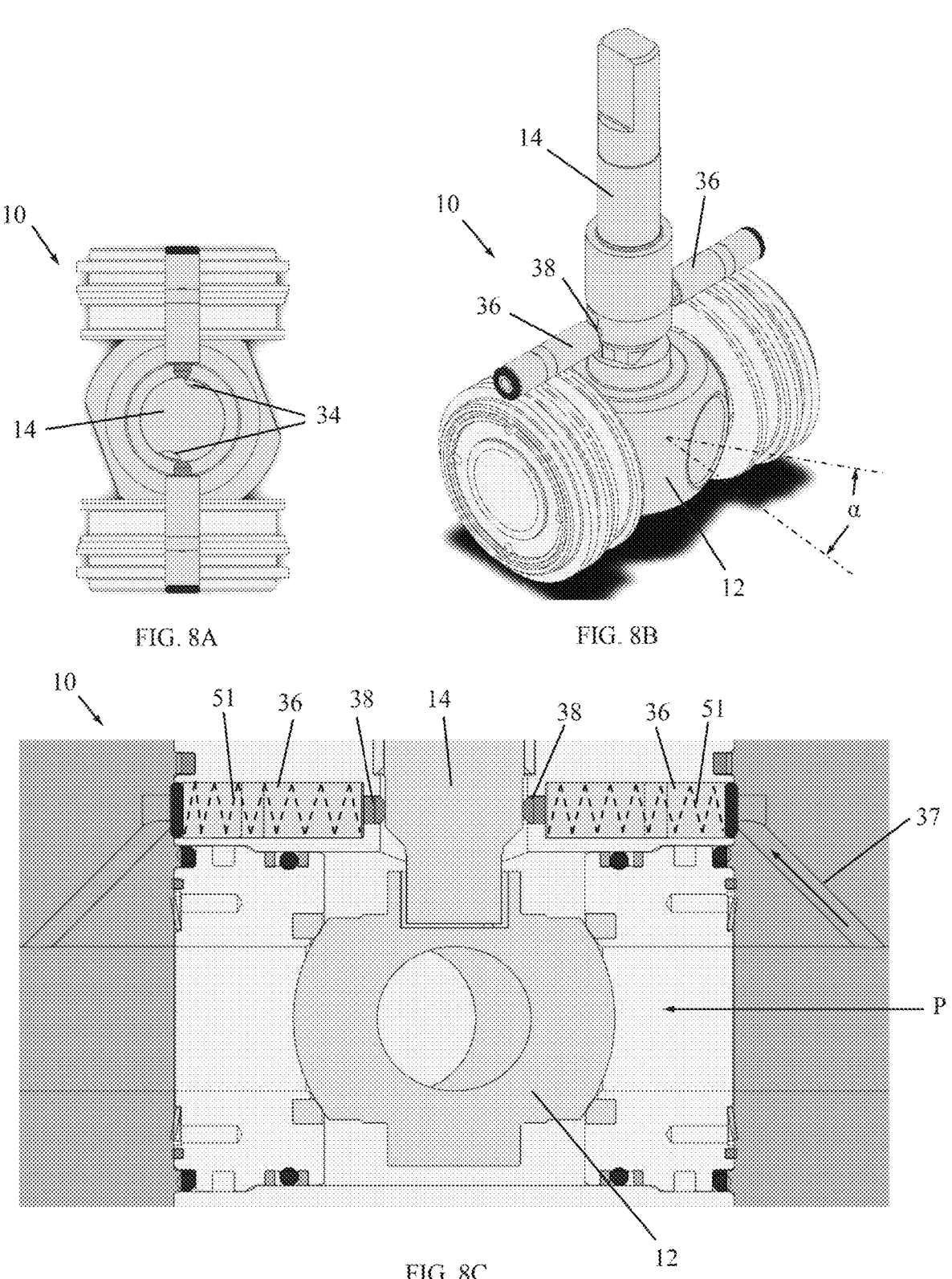
FIGS. 8A, 8B, and 8C are simplified top-view, perspective, and front-view illustrations of the ball valve in the closed position and the bypass structure of the stem in the closed position, in accordance with a non-limiting embodiment of the invention.

Reference is now made to FIGS. 8A, 8B, and 8C, which shows the first step of operation. The ball valve 10 is in the closed position and piston 38 abuts against the outer contour of stem 14. In this position, piston 38 is pressed into bypass tube 36 and compresses the biasing device 51. In this position, piston 38 seals bypass tube 36 so no fluid can flow through bypass tube 36. Thus, as seen in FIG. 8C, there is no flow into the upstream bypass tube 36 from upstream diverging tube 37; that is, there is no bypass flow at this position. The ball 12 is not at 90° but instead is rotationally offset from the 90° position by angle α, as described above.

Figures 9A, 9B, 9C:
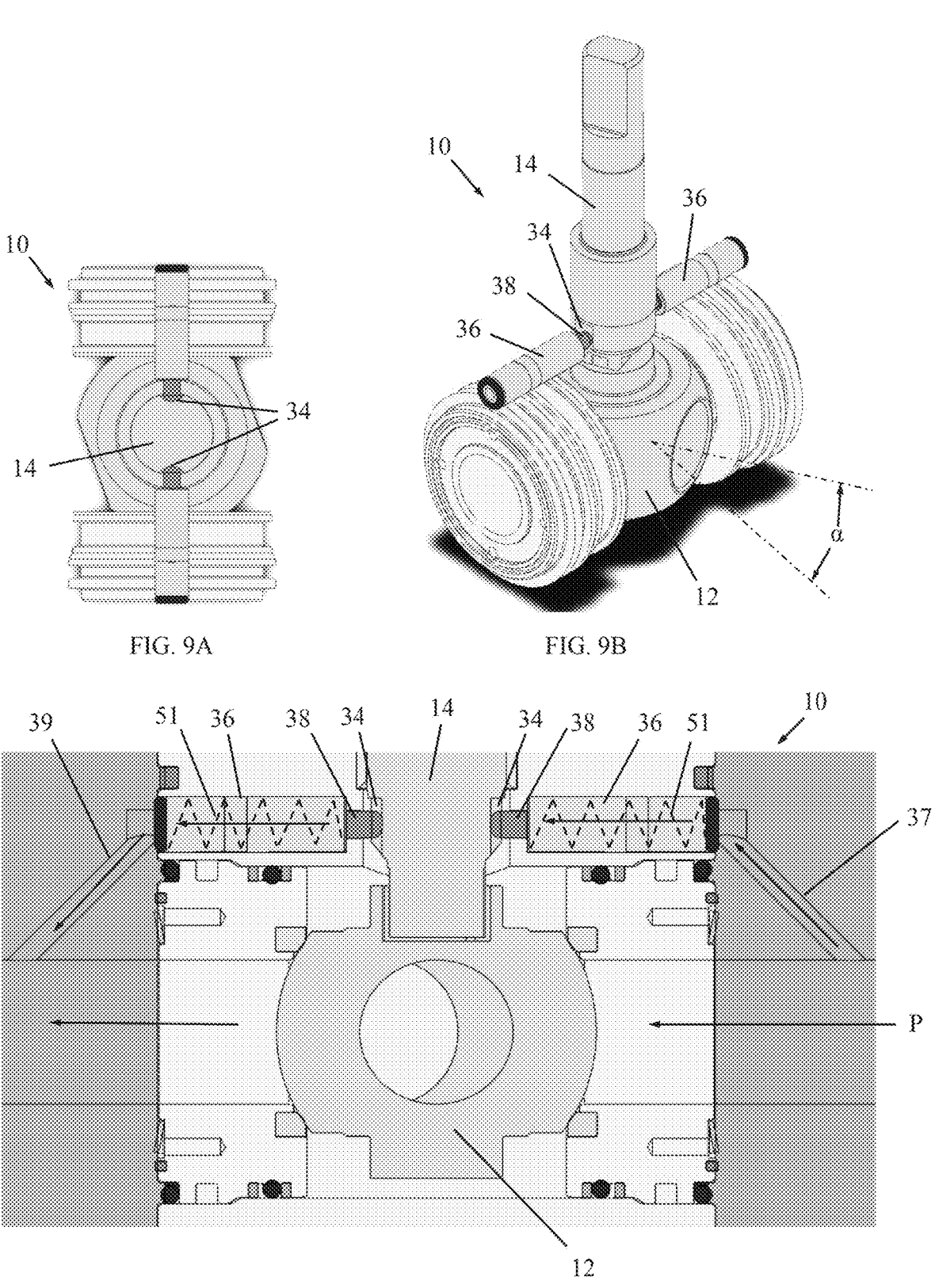
FIGS. 9A, 9B, and 9C are simplified top-view, perspective, and front-view illustrations of the ball valve in the closed position and the bypass structure of the stem turned to the open position (through the angle α), in accordance with a non-limiting embodiment of the invention.

Reference is now made to FIGS. 9A, 9B, and 9C, which shows the second step of operation. In the second step, rotating the stem 14 through rotation angle α is made with low torque (due to the "backlash", that is, the free play described above), and there is no movement of the ball 12. Once the stem has completed rotation through angle α, the bypass indentation 34 is now aligned with piston 38. The force of biasing device 51 moves piston 38 to abut against bypass indentation 34, instead of the outer contour of stem 14, which moves piston 38 outwards from bypass tube 36. In this position, piston 38 does not seal bypass tube 36 and fluid can now flow from upstream diverging tube 37 through the upstream bypass tube 36. Before the fluid starts to leak, due to the presence of relatively high upstream pressure, the torque required for rotating the stem increases significantly and the operator element cannot overcome the torque. When the fluid leaks out of the end of upstream bypass tube 36 near the upstream piston 38, the fluid starts to circulate in the area around the stem 14. This fluid is at a relatively high pressure as opposed to the inside of the downstream bypass tube 36 which is at relatively low pressure (such as atmospheric pressure). The difference in pressures is such that the relatively high pressure fluid now circulating in the area around the stem 14 enters (and may even be sucked into) the end of the downstream bypass tube 36 near the downstream piston 38. The fluid then exits through the downstream diverging tube 39 located at the other end of bypass tube 36 (the end not near stem 14). Accordingly, the bypass is open (through upstream diverging tube 37 and a downstream diverging tube 39) and the fluid pressure starts balancing in the downstream portion, that is, the difference in pressure between the upstream and downstream portions starts to decrease.

Figures 10A, 10B, 10C:
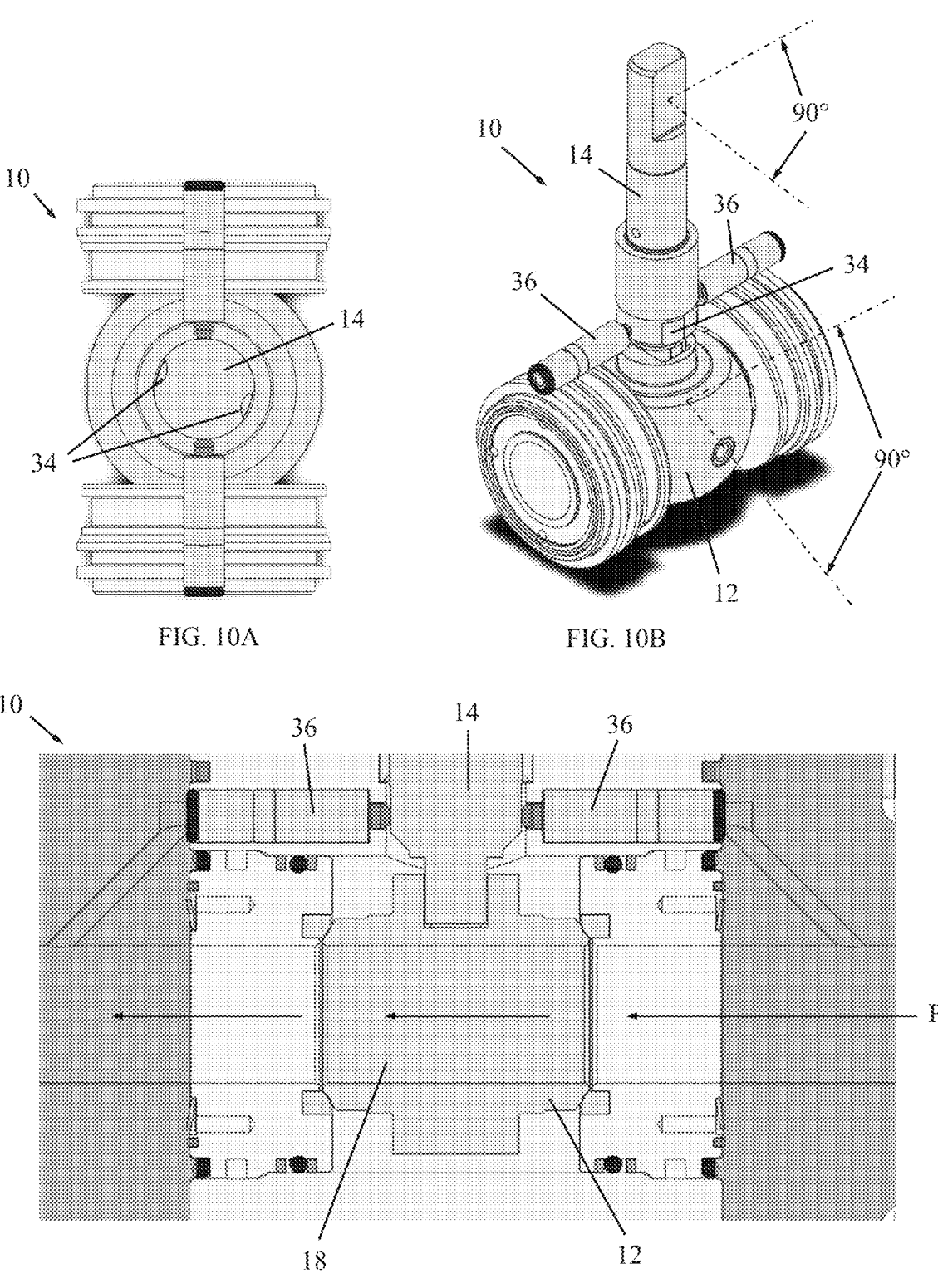
FIGS. 10A, 10B, and 10C are simplified top-view, perspective, and front-view illustrations of the ball valve in the open position and the bypass structure of the stem in the closed position, in accordance with a non-limiting embodiment of the invention. Alternatively, with the ball valve in the open position, the bypass structure of the stem may be designed to remain in the open position.

Reference is now made to FIGS. 10A, 10B, and 10C, which shows the third step of operation. In the third step, the difference in pressure between the upstream and downstream portions has been significantly reduced with the result that the valve torque is also significantly reduced, and the operator element is now able to complete the stroke and open the valve to the maximum flow.

TABLE 1

| Step | Ball angle | Stem angle | Ball valve | Bypass valve | Upstream pressure | Downstream pressure | Stem torque | Valve torque |
|---|---|---|---|---|---|---|---|---|
| 1 | α | 0 | close | close | high | 0 | low | high |
| 2 | α | α | close | open | high | balancing | High –> decreasing | High –> decreasing |
| 3 | 90° | 90° | open | close | high | high | low | low |

Alternatively, with the ball valve in the open position, the bypass structure of the stem may be designed to remain in the open position.

It is further noted that instead of the illustrated bypass structure, alternatively, the bypass structure could be a bypass through hole through the stem which can become aligned with the bypass tube when the stem is rotated. No piston is then required. When the stem is rotated to align the bypass through hole with the upstream and downstream bypass tubes, fluid can flow through the upstream bypass tube through the bypass through hole and from there through the downstream bypass tube.

It is also noted that instead of being an indentation, the bypass structure may alternatively be a protrusion that pushes the piston into the bypass tube which allows fluid flow through the bypass tube. The protrusion is a surface which is radially outwards of the outer contour of stem 14.

What is claimed is:

1. A valve comprising:
   a ball coupled to a stem which is turnable by an operator element, said ball being formed with a flow passage and said ball being sealed in a valve seat by means of seals; and
   wherein said stem comprises a bypass structure, which upon rotation of said stem, is alignable with an upstream diverging tube and with a downstream diverging tube to allow bypass fluid flow from said upstream diverging tube to said downstream diverging tube for balancing a difference in pressure between upstream and downstream portions of said valve,
   and wherein said stem comprises a ball key portion which couples with a keyway aperture formed in an interface member extending from said ball, and said ball key portion is shaped to allow free rotation of said stem with respect to said keyway aperture through a rotation angle α, and wherein said ball key portion comprises a pair of relatively long flat faces that are inclined so a width of said ball key portion is widest at a center of a long side of said ball key portion, and a pair of relatively short flat faces that are inclined so a length of said ball key portion is longest at a center of a short side of said ball key portion.

2. The valve according to claim 1, wherein an outer diameter of said ball and a diameter of said flow passage are such that when said ball is turned 90° minus a rotation angle α from a fully open position, said ball is closed to flow therethrough, and said bypass structure is aligned with said upstream diverging tube and with said downstream diverging tube upon rotation of said stem through said rotation angle α.

3. The valve according to claim 1, wherein said bypass structure comprises an indentation formed on said stem, said indentation having a surface which is radially inwards of an outer contour of said stem.

4. The valve according to claim 1, wherein when said flow passage of said ball is open to flow, said bypass structure blocks the bypass fluid flow from said upstream diverging tube to said downstream diverging tube.

5. A valve comprising:

a ball coupled to a stem which is turnable by an operator element, said ball being formed with a flow passage and said ball being sealed in a valve seat by means of seals; and wherein said stem comprises a bypass structure, which upon rotation of said stem, is alignable with an upstream diverging tube and with a downstream diverging tube to allow bypass fluid flow from said upstream diverging tube to said downstream diverging tube for balancing a difference in pressure between upstream and downstream portions of said valve, wherein said bypass structure is positioned between, and is rotatable to align with, a pair of bypass pistons which are arranged to slide inside bypass tubes, one of said bypass tubes being an upstream bypass tube which is in fluid communication with said upstream diverging tube, and another one of said bypass tubes being a downstream bypass tube which is in fluid communication with said downstream diverging tube, and wherein each of said pistons is urged by a biasing device towards said stem.

6. The valve according to claim 5, wherein when said pistons abut against an outer contour of said stem and not against said bypass structure, said pistons seals said bypass tubes so the bypass fluid flow cannot flow from said upstream diverging tube to said downstream diverging tube.

7. The valve according to claim 5, wherein when said pistons abut against said bypass structure, said pistons do not seal said bypass tubes so the bypass fluid flow can flow from said upstream diverging tube to said downstream diverging tube.

8. The valve according to claim 7, wherein when said pistons abut against said bypass structure, the bypass fluid flow leaks out of said upstream bypass tube and circulates in an area around said stem and enters said downstream bypass tube and then exits through said downstream diverging tube.

9. A valve comprising:

a ball coupled to a stem which is turnable by an operator element, said ball being formed with a flow passage and said ball being sealed in a valve seat by means of seals; and wherein said stem comprises a bypass structure, which upon rotation of said stem, is alignable with an upstream diverging tube and with a downstream diverging tube to allow bypass fluid flow from said upstream diverging tube to said downstream diverging tube for balancing a difference in pressure between upstream and downstream portions of said valve, wherein when said flow passage of said ball is open to flow, said bypass structure permits the bypass fluid flow from said upstream diverging tube to said downstream diverging tube.

* * * * *